United States Patent
Shi et al.

(10) Patent No.: US 11,507,798 B2
(45) Date of Patent: Nov. 22, 2022

(54) OBJECT RECOGNITION METHOD AND APPARATUS AND SINGLE STEP OBJECT RECOGNITION NEURAL NETWORK

(71) Applicant: FUJITSU LIMITED, Kawasaki (JP)

(72) Inventors: Lu Shi, Beijing (CN); Qi Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 427 days.

(21) Appl. No.: 16/750,440

(22) Filed: Jan. 23, 2020

(65) Prior Publication Data

US 2020/0265314 A1    Aug. 20, 2020

(30) Foreign Application Priority Data

Feb. 19, 2019   (CN) .......................... 201910121365.2

(51) Int. Cl.
| | |
|---|---|
| *G06N 3/04* | (2006.01) |
| *G06K 9/62* | (2022.01) |
| *G06V 10/44* | (2022.01) |
| *G06V 10/82* | (2022.01) |
| *G06N 3/08* | (2006.01) |

(52) U.S. Cl.
CPC .............. *G06N 3/04* (2013.01); *G06K 9/6232* (2013.01); *G06N 3/0445* (2013.01); *G06N 3/0454* (2013.01); *G06N 3/082* (2013.01); *G06V 10/454* (2022.01); *G06V 10/82* (2022.01)

(58) Field of Classification Search
CPC ...... G06N 3/04; G06N 3/0445; G06N 3/0454; G06N 3/082; G06K 9/6232; G06V 10/454; G06V 10/82
See application file for complete search history.

(56) References Cited

U.S. PATENT DOCUMENTS

| | | | | |
|---|---|---|---|---|
| 2020/0272863 | A1* | 8/2020 | Lee .................... | G06K 9/6271 |
| 2020/0410273 | A1* | 12/2020 | Miao ................... | G06V 10/255 |

FOREIGN PATENT DOCUMENTS

| | | |
|---|---|---|
| CN | 107563372 A | 1/2018 |
| CN | 107564025 A | 1/2018 |
| CN | 108229580 A | 6/2018 |
| WO | WO 2018/128741 A | 7/2018 |

OTHER PUBLICATIONS

Liu et al., "SSD: Single Shot MultiBox Detector" arXiv:1512.02325v5 [cs.CV] Dec. 29, 2016 (Year: 2016).*

(Continued)

*Primary Examiner* — John C Kuan
(74) *Attorney, Agent, or Firm* — Staas & Halsey LLP

(57) ABSTRACT

Embodiments of this disclosure provide an object recognition method and apparatus and a single step object recognition neural network, in which by replacing a part of convolutional layers in a conventional single shot multibox detector (SSD) network with dilate convolution, limitation on a size of an input image may be reduced; by increasing connection paths, accuracy of object recognition may be improved; and by connecting the convolutional layers by using residual structures, a convergence effect may be ensured, and accuracy of object recognition may be improved.

12 Claims, 6 Drawing Sheets

(56) References Cited

OTHER PUBLICATIONS

Jogin et al., "Feature Extraction using Convolution Neural Networks (CNN) and Deep Learning" 2018 3rd IEEE International Conference on Recent Trends in Electronics, Information & Communication Technology (Year: 2018).*

Sapijaszko et al., "An Overview of Recent Convolutional Neural Network Algorithms for Image Recognition" 2018 IEEE (Year: 2018).*

Wei Xiang et al.; Context-Aware Single-Shot Detector, 2018 IEEE Winter Conference on Applications of Computer Vision, p. 1784 to 1793; (10 pages).

\* cited by examiner

OBJECT RECOGNITION METHOD AND APPARATUS AND SINGLE STEP OBJECT RECOGNITION NEURAL NETWORK

CROSS-REFERENCE TO RELATED APPLICATIONS

This application is based on and hereby claims priority under 35 USC 119 to Chinese Patent Application No. 201910121365.2, filed Feb. 19, 2019, in the China National Intellectual Property Administration, the entire contents of which are incorporated herein by reference.

FIELD

This disclosure relates to the field of object recognition technologies, and in particular to an object recognition method and apparatus and a single step object recognition neural network.

BACKGROUND

Object recognition is one of the most important research directions in the field of machine vision. Nowadays, engineering requires both high precision and real-time capabilities, which makes neural network object recognition technology mainstream. Deep learning of conventional object recognition methods may be divided into two parts. One is a candidate region extraction method, such as a faster region convolutional neural network (faster R-CCN) and a region-fully convolutional network (R-FCN). And the other is a single step method, such as single shot multibox detector (SSD) and You Only Look Once (YOLO).

The former method complicates extraction of a region of interest (ROI), resulting in slower speed. The latter method is a real-time object detection algorithm, and as it omits an ROI pool and reduces an amount of computation, some of them may be 30 fps faster than GPU-assisted speeds.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that the single-step method also has some defects. A first one is a balance between speed and overall accuracy. Generally, a detection accuracy of high-speed networks is difficult to meet requirements. A second one is detection accuracy of small-sized objects. Without an ROI pool, too small image input makes it difficult to fully retain features of small objects in convolutional operations, especially for dense objects. A third one is limitation on input sizes, for example, a minimum limit of the SSD network resolution is 300×300. In summary, in the existing single-step methods, high speed means low accuracy, small object detection capability is relatively weak, and input images with low resolution cannot be inputted.

In order to solve at least one of the above problems or other similar problems, embodiments of this disclosure provide an object recognition method and apparatus and a single step object recognition neural network, in which speed may be increased while maintaining accuracy, capability of detecting small objects may be improved, and input images with low resolution may be inputted.

According to a first aspect of the embodiments of this disclosure, there is provided a single step object recognition neural network, wherein the single step object recognition neural network includes: multiple first convolutional layer groups, the multiple first convolutional layer groups being connected to each other to extract features of an input image, and output of a last first convolutional layer group in the multiple first convolutional layer groups being taken as input of a detecting module, and each first convolutional layer group comprising three first convolutional layers, the three first convolutional layers in each first convolutional layer group being connected via a residual structure; multiple second convolutional layers, each second convolutional layer being located between two first convolutional layer groups; multiple second convolutional layer groups, output of the multiple second convolutional layer groups being taken as input of the detecting module, at least two of the multiple second convolutional layer groups being not connected to each other, and the at least two second convolutional layer groups being connected to at least two of the first convolutional layer groups, one of the at least two second convolutional layer groups being connected to other second convolutional layer groups than the at least two second convolutional layer groups, and each second convolutional layer group comprising two third convolutional layers, one of two third convolutional layers in second convolutional layer groups connected to each other using dilate convolution; and a fourth convolutional layer, the fourth convolutional layer being connected to a last one of the multiple second convolutional layer groups, and output of the fourth convolutional layer being taken as input of the detecting module.

According to a second aspect of the embodiments of this disclosure, there is provided an object recognition method, wherein the method includes: features of an input image are extracted by using the single step object recognition neural network as described in the first aspect; and object recognition is performed according to the extracted features.

According to a third aspect of the embodiments of this disclosure, there is provided an object recognition apparatus, wherein the apparatus includes: a feature extracting unit configured to extract features of an input image by using the single step object recognition neural network as described in the first aspect; and a detecting unit configured to perform object recognition according to the features extracted by the feature extracting unit.

According to a fourth aspect of the embodiments of this disclosure, there is provided a computer readable program, which, when executed in an object recognition apparatus or an image processing device, will cause the object recognition apparatus or the image processing device to carry out the object recognition method as described in the second aspect.

According to a fifth aspect of the embodiments of this disclosure, there is provided a computer readable medium, including a computer readable program, which will cause an object recognition apparatus or an image processing device to carry out the object recognition method as described in the second aspect.

An advantage of the embodiments of this disclosure exists in that by replacing a part of convolutional layers in a conventional single shot multibox detector (SSD) network with dilate convolution, limitation on a size of an input image may be reduced; by increasing connection paths, accuracy of object recognition may be improved; and by connecting the convolutional layers by using residual structures, a convergence effect may be ensured, and accuracy of object recognition may be improved as a whole.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is clear and understood that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

Various implementations of the embodiments of this disclosure shall be described below with reference to the accompanying drawings. These implementations are illustrative only, and are not intended to limit this disclosure.

Embodiment 1

Figure 1:
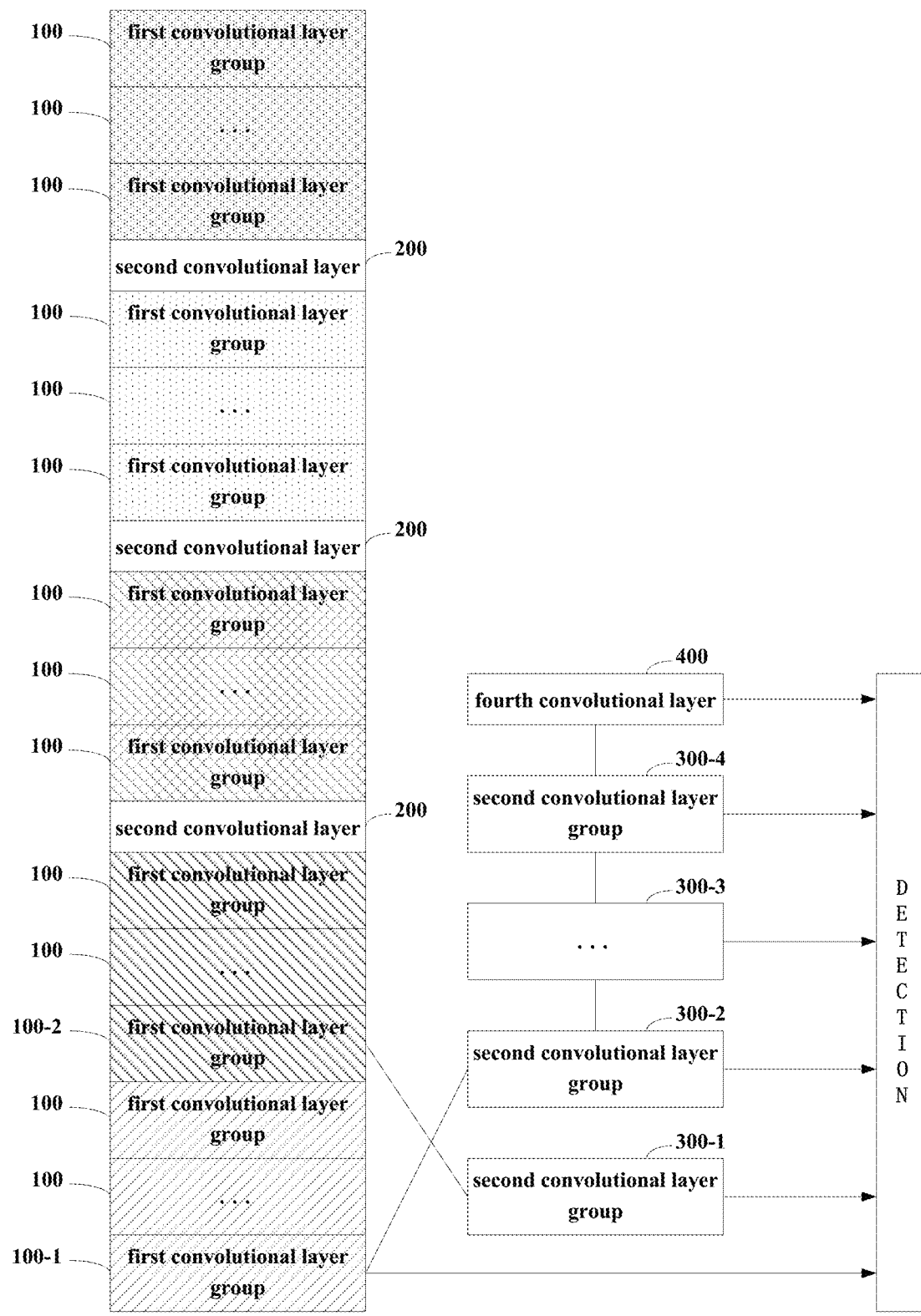
FIG. 1 is a schematic diagram of the single step object recognition neural network of Embodiment 1.

This embodiment provides a single step object recognition neural network. FIG. 1 is a schematic diagram of the single step object recognition neural network of this embodiment. As shown in FIG. 1, the single step object recognition neural network includes multiple first convolutional layer groups 100, multiple second convolutional layers 200, multiple second convolutional layer groups 300 and a fourth convolutional layer 400. In this embodiment, the first convolutional layer groups 100 and the second convolutional layers 200 may also be referred to as "a feature extraction network", and the second convolutional layer groups 300 and the fourth convolutional layer 400 may also be referred to as "a classification regression network". Definitions of the feature extraction network and the classification regression network are identical to those in the related art, and shall not be described herein any further.

In this embodiment, as shown in FIG. 1, the above multiple first convolutional layer groups 100 are connected to each other to extract features of an input image, and output of a last first convolutional layer group (i.e. convolutional layer group of a deepest depth, such as 100-1 shown in FIG. 1) in the multiple first convolutional layer groups 100 is taken as input of a detecting module. In this embodiment, each first convolutional layer group 100 may include three convolutional layers (referred to as first convolutional layers), the three first convolutional layers in each first convolutional layer group 100 may be connected via residual structures. By connecting the convolutional layers in the multiple first convolutional layer group 100 by using the residual structures, a convergence effect may be ensured, and accuracy of object recognition may be improved as a whole.

In this embodiment, the number of convolution layers included in each first convolution layer group 100 may not be limited to three, and the three convolutional layers may not be connected by residual structures; for example, they may be connected in a dense connection manner, or may be connected by other existing means.

In this embodiment, as shown in FIG. 1, the above multiple second convolutional layers 200 are respectively located between two first convolutional layer groups 100, and may be pooling layers. Reference may be made to the related art for a definition and implementation of the pooling layers, which shall not be described herein any further.

In this embodiment, as shown in FIG. 1, outputs of the above multiple second convolutional layer groups 300 are taken as input of the detecting module, at least two of the above multiple second convolutional layer groups 300 are not connected to each other, and the at least two second convolutional layer groups 300 are connected to at least two of the first convolutional layer groups 100. Taking FIG. 1 as an example, a second convolutional layer group 300-1 is connected to a first convolutional layer group 100-2, a second convolutional layer group 300-2 is connected to a first convolutional layer group 100-1, and the second convolutional layer group 300-1 is not connected to the second convolutional layer group 300-2. Thus, at least two connection paths are constituted between the feature extraction and the classification regression, thereby preventing all feature information being converged on one layer (regression layer, i.e. the second convolutional layer groups 300) and solving a problem of low detection accuracy.

In this embodiment, as shown in FIG. 1, one of the at least two second convolutional layer groups 300 and other second convolutional layer groups 300 than the above at least two second convolutional layer groups 300 are connected to each other, each second convolutional layer group 300 includes two third convolutional layers, and one of two third convolutional layers in the second convolutional layer groups 300 connected to each other employs dilated convolution.

Taking FIG. 1 as an example, the second convolutional layer group 300-2 and second convolutional layer groups 300-3 and 300-4 are connected to each other, each of the second convolutional layer groups 300-1 to 300-4 includes two third convolutional layers, and one of two third convolutional layers in the second convolutional layer groups 300-2 to 300-4 uses dilated convolution. Thus, the feature of the dilated convolution is used, and the limitation on the size of the input image is reduced. Reference may be made to the related art for a definition and implementation of the dilated convolution, which shall not be described herein any further.

In this embodiment, a stride of the dilated convolution may be 2, or may be other values, which is not limited in this embodiment. And the dilated convolution may use the Atrous algorithm or the Hole algorithm, or may use other known implementable algorithms.

In this embodiment, as shown in FIG. 1, the fourth convolutional layer 400 is connected to a last one of the multiple second convolutional layer groups 300 (300-4 shown in FIG. 1), and output of the fourth convolutional layer 400 is also taken as input of the detection module. In this embodiment, the fourth convolutional layer 400 may also be a pooling layer. Reference may be made to the related art for a definition and implementation of the pooling layer, which shall not be described herein any further.

The single step object recognition neural network of this embodiment reduces limitation on the size of the input image by replacing a part of convolutional layers in a conventional single shot multibox detector (SSD) network with the dilated convolution; by increasing connection paths, accuracy of object recognition may be improved; and by connecting the convolutional layers by using the residual structures, a convergence effect may be ensured, and the accuracy of object recognition is improved as a whole.

In this embodiment, at least two first convolutional layer groups 100 connecting at least two second convolutional layer groups 300 are not adjacent to each other. Taking FIG. 1 as an example, the first convolutional layer group 100-1 and the first convolutional layer group 100-2 are connected to the second convolutional layer group 300-2 and the second convolutional layer group 300-1, respectively, and the first convolutional layer group 100-1 and the first convolutional layer group 100-2 are not adjacent to each other, for example, they are spaced apart by at least one first convolutional layer group 100. Hence, it is possible to ensure that two connection paths converge different feature information to different second convolutional layer groups 300, thereby improving the detection accuracy. In this embodiment, the number of spaced first convolutional layer groups 100 is not limited, which may be one, two, three, four, or more. The greater the number of the spaced first convolutional layer groups 100, the greater the differences between the feature information converged into the second convolutional layer groups 300.

In this embodiment, a dilate coefficient of a first convolutional layer in at least one of the multiple first convolutional layer groups 100 is 2. Taking FIG. 1 as an example, dilate coefficients of a first convolutional layer in the first convolutional layer group 100-1 and in a first convolutional layer group 100 between the first convolutional layer group 100-1 and the first convolutional layer group 100-2 may be 2, which may reduce the limitation on the size of the input image and maintain more features. The number of the first convolutional layer groups 100 having the first convolutional layers with the dilated coefficient of 2 is not limited in this embodiment, which may be one, two, three, four, or more. For example, it may be that a dilated coefficient of a first convolutional layer in four first convolutional layer groups from bottom in the multiple first convolutional layer groups 100 is 2.

In this embodiment, the number of the first convolutional layer groups 100 is not limited, and positions of the second convolutional layers 200 are not limited, as long as they are located between two first convolutional layer groups 100. In addition, in this embodiment, the number of the second convolutional layer groups 300 is also not limited, which may be four, or may be other numbers.

Figure 2:
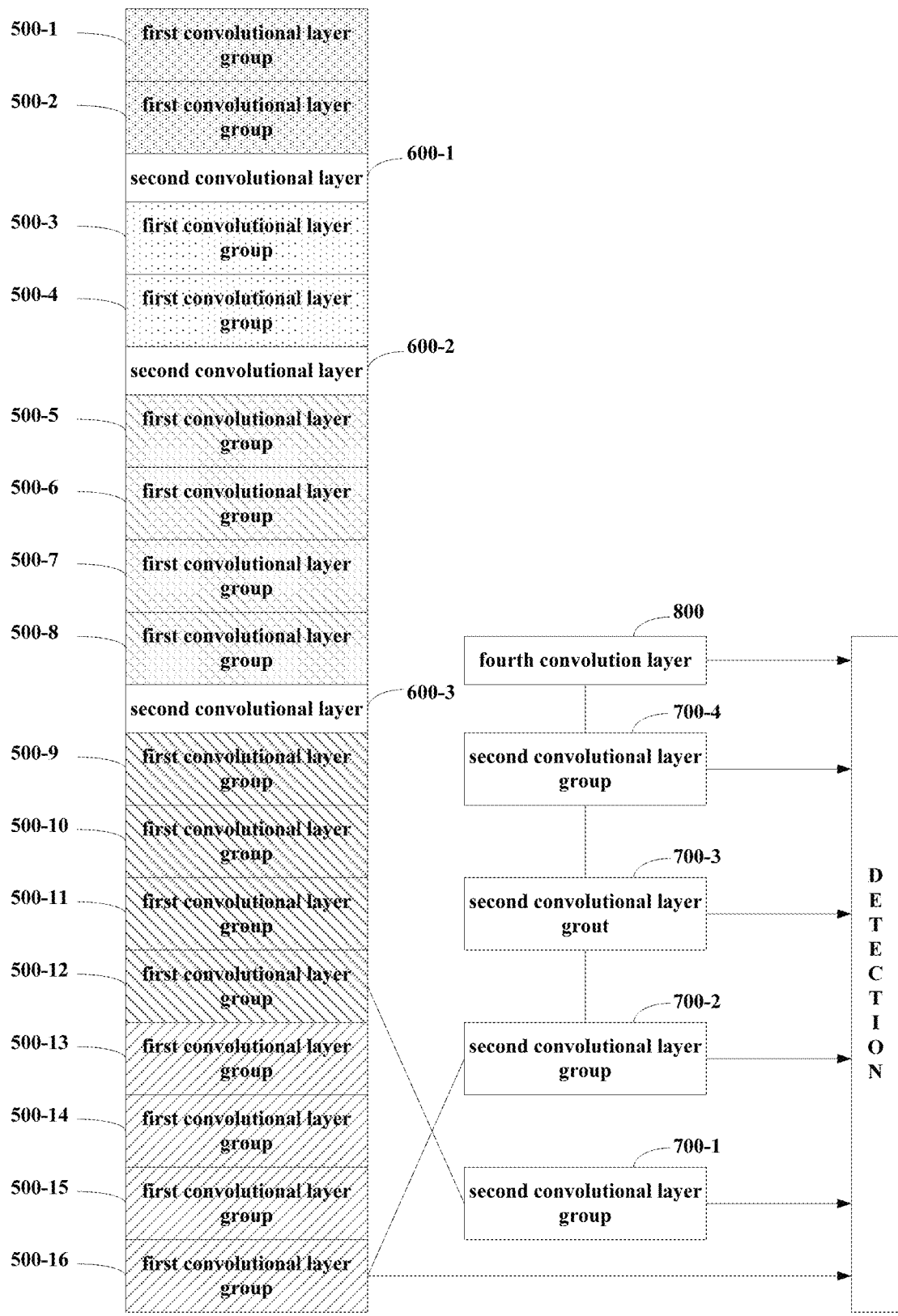
FIG. 2 is another schematic diagram of the single step object recognition neural network of Embodiment 1.

FIG. 2 is another schematic diagram of the single step object recognition neural network of this embodiment. As shown in FIG. 2, in this single step object recognition neural network, the number of first convolutional layer groups is 16, which are denoted by 500-1~500-16; the number of the second convolutional layers is 3, which are denoted by 600-1~600-3; the number of the second convolutional layer groups is 4, which are denoted by 700-1~700-4; and the number of the fourth convolution layer is 1, which is denoted by 800.

Moreover, in the example of FIG. 2, structures of the first convolutional layer groups 500-1 to 500-2 are identical, structures of the first convolutional layer groups 500-3 to 500-4 are identical, structures of the first convolutional layer groups 500-5~500-8 are identical, structures of the first convolutional layer groups 500-9~500-12 are identical, and structures of the first convolutional layer groups 500-13~500-4416 are identical. Here, the structures being identical refers to that coefficients (such as the number of the filters, size and dilated coefficient etc.) of the included three first convolution layers are identical.

Figure 3:
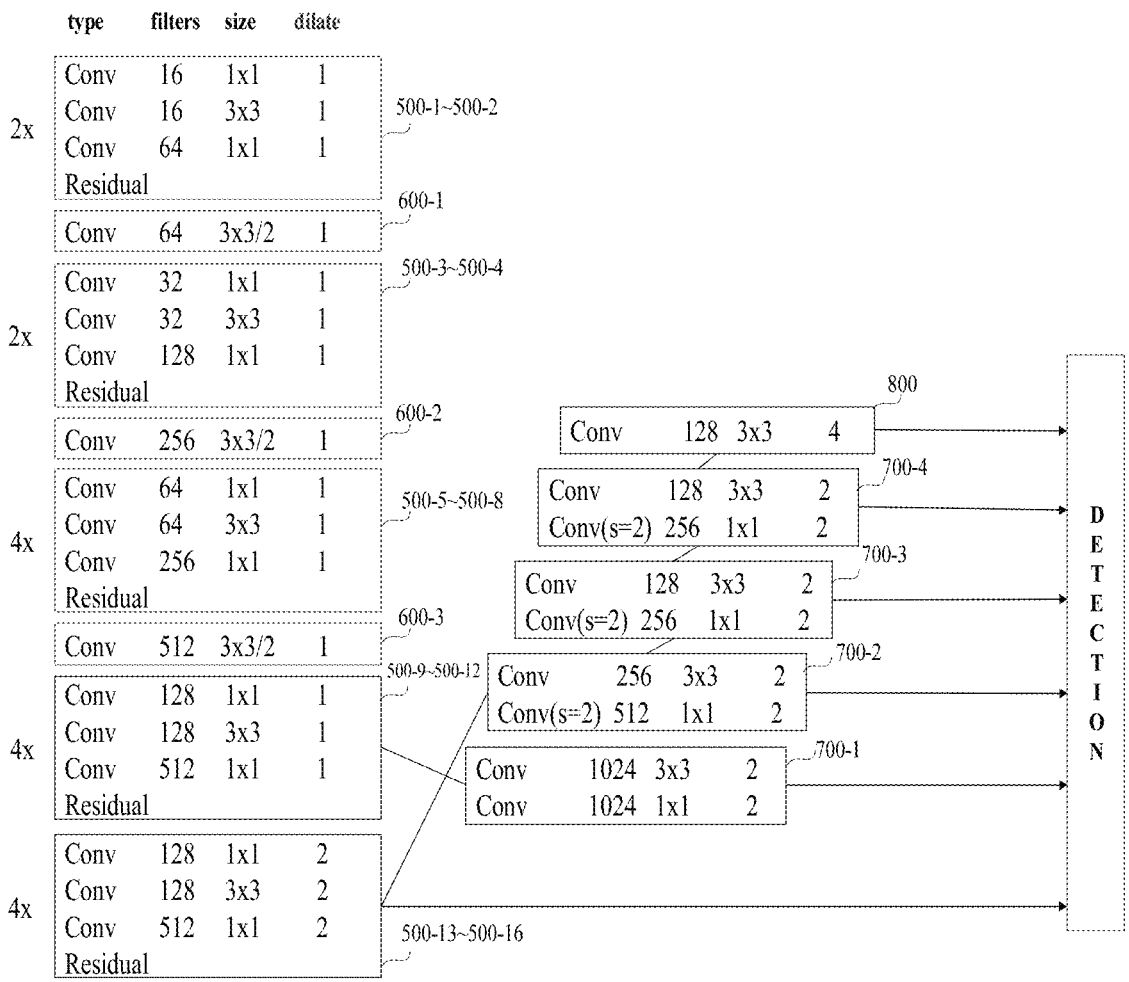
FIG. 3 is a schematic diagram of one particular implementation of the single step object recognition neural network shown in FIG. 2.

FIG. 3 is a schematic diagram of one particular implementation of the single step object recognition neural network shown in FIG. 2. As shown in FIG. 3, in this single step object recognition neural network, a structure of the first convolution layer groups 500, coefficients of first convolutional layers included in the first convolutional layer groups 500, coefficients of the second convolutional layers 600, a structure of the second convolutional layer groups 700, coefficients of third convolutional layers included in the second convolutional layer groups 700, and a coefficient of the fourth convolutional layer 800, are shown. The example in FIG. 3 is illustrative only, and according to the particular implementation, the first convolutional layer groups 500 may include more or less first convolutional layers, the second convolutional layer groups 700 may also include more or less third convolutional layers, and coefficients of the convolutional layers may also be other values.

In the above embodiment, description is given by taking that the first convolutional layer groups 100 and 500 include three first convolutional layers and the second convolutional layer groups 300 and 700 include two third convolutional layers as an example. However, this embodiment is not limited thereto, and the number of the first convolutional layers included in the first convolutional layer groups 100 and 500 and the number of the third convolutional layers included in the second convolutional layer groups 300 and 700 may be other numbers, dependent on particular implementations.

By using the single step object recognition neural network of this embodiment, higher object recognition accuracy and higher small object recall rate may be achieved. Moreover, as the number of times of down-sampling is reduced, minimum allowable input image size is also reduced.

Table 1 is experimental results of the single step object recognition neural network of this embodiment in comparison with the existing SSD network and YOLO V3 network under the same conditions. In this experiment, the dataset is 50,000 photos taken by a traffic surveillance camera. Objects in the photos include all vehicles on the road. 45,000 photos are selected as a training dataset, and 5000 photos are selected as an evaluation dataset, thereby obtaining data shown in Table 1.

TABLE 1

| Dataset: vehicle detection dataset | minimum input size restriction | Speed (GTX10810Ti) | Accuracy Map-10 epochs |
|---|---|---|---|
| SSD | 300 | 300 × 300 input-20 ms/f | 0.63 |
| YOLO V3 | 320 | 300 × 320 input-30 ms/f | 0.76 |
| This embodiment | 64 | 320 × 320 input-25 ms/f | 0.76 |

Figure 4:
FIG. 4 is a schematic diagram of recognition results of object recognition performed by using the single step object recognition neural network of this embodiment and an existing SSD network under the same conditions.
Figure 4:

FIG. 4 is a schematic diagram of experimental results by using the single step object recognition neural network of this embodiment and an existing SSD network under the same conditions, in which the left side shows an experiment result obtained by using the existing SSD network, and the right side shows an experiment result obtained by using the single step object recognition neural network of this embodiment. It can be seen from FIG. 4 that only one bus may be recognized by using the existing SSD network, while cars of small sizes in addition to the above bus may be recognized by using the single step object recognition neural network of this embodiment.

By replacing a part of convolutional layers in a conventional single shot multibox detector (SSD) network with dilate convolution, limitation on a size of an input image may be reduced; by increasing connection paths, accuracy of object recognition may be improved; and by connecting the convolutional layers by using residual structures, a convergence effect may be ensured, and accuracy of object recognition may be improved as a whole.

Embodiment 2

Figure 5:
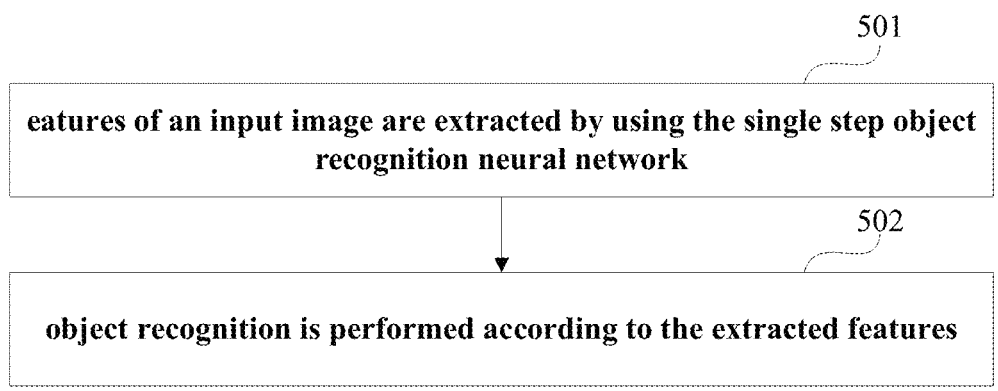
FIG. 5 is a schematic diagram of the object recognition method of Embodiment 2.

This embodiment provides an object recognition method. FIG. 5 is a schematic diagram of the object recognition method of this embodiment. As shown in FIG. 5, the method includes:

step 501: features of an input image are extracted by using the single step object recognition neural network as described in Embodiment 1; and step 502: object recognition is performed according to the extracted features.

In this embodiment, as the features of the input image are extracted by using the single step object recognition neural network as described in Embodiment 1, accuracy of object recognition may be improved, a convergence effect may be ensured, and accuracy of object recognition may be improved as a whole.

Furthermore, limitation on the size of the input image may be reduced by using the method of this embodiment. For example, the size of the input image may be not only greater than 300×300, but also less than 300×300, and objects in the input image may be recognized.

In this embodiment, reference may be made to the related art for a particular implementation of the feature extraction and a particular implementation of the object recognition, which shall not be described herein any further.

Embodiment 3

This embodiment provides an object recognition apparatus. As principles of the apparatus for solving problems are similar to that of the method in Embodiment 2, reference may be made to the implementation of the method in Embodiment 2 for implementation of the apparatus, with identical contents being not going to be described herein any further.

Figure 6:
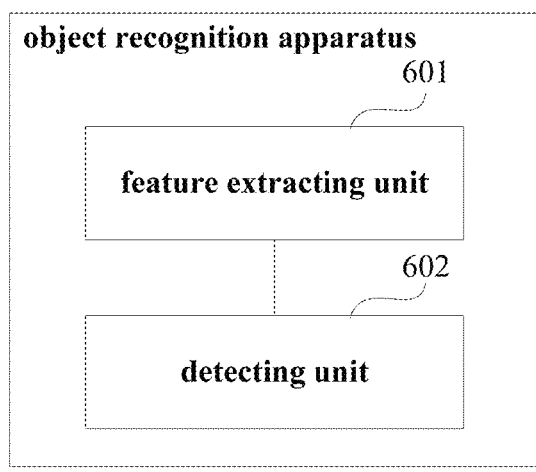
FIG. 6 is a schematic diagram of the object recognition apparatus of Embodiment 3.

FIG. 6 is a schematic diagram of the object recognition apparatus of this embodiment. As shown in FIG. 6, the object recognition apparatus includes a feature extracting unit 601 and a detecting unit 602; wherein the feature extracting unit 601 is configured to extract features of an input image by using the single step object recognition neural network as described in Embodiment 1, and the detecting unit 602 is configured to perform object recognition according to the features extracted by the feature extracting unit 601.

In this embodiment, as the features of the input image are extracted by using the single step object recognition neural network as described in Embodiment 1, accuracy of object recognition may be improved, a convergence effect may be ensured, and accuracy of object recognition may be improved as a whole.

Embodiment 4

This embodiment provides an image processing device, including the object recognition apparatus as described in Embodiment 3.

Figure 7:
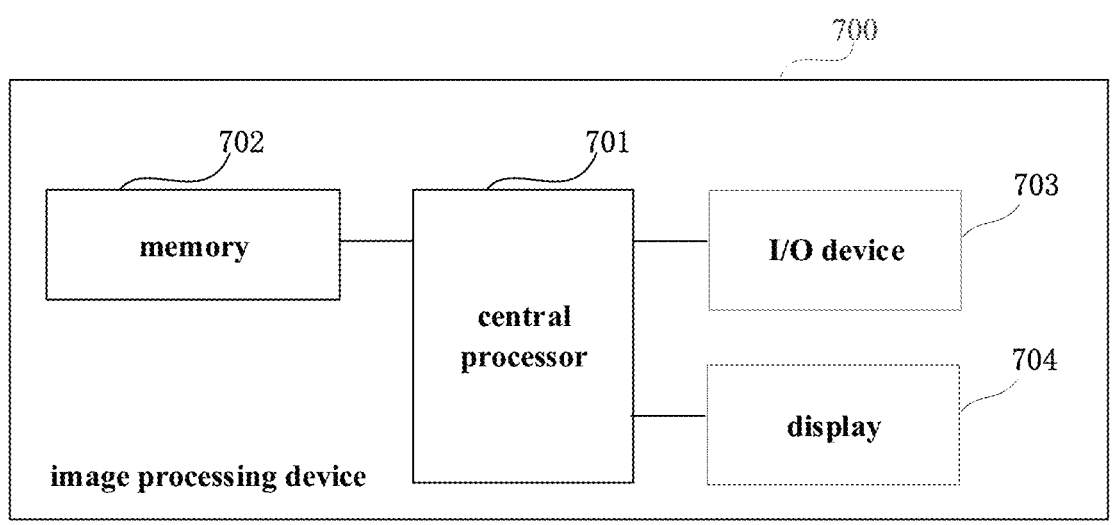
FIG. 7 is a schematic diagram of the image processing device of Embodiment 4.

FIG. 7 is a schematic diagram of the image processing device of this embodiment. As shown in FIG. 7, the image processing device 700 may include a central processor 701

(CPU) and a memory 702, the memory 702 being coupled to the central processor 701. The memory 702 may store various data, and furthermore, it may store a program for data processing, and execute the program under control of the central processor 701.

In one implementation, the functions of the object recognition apparatus may be integrated into the central processor 701, wherein the central processor 701 may be configured to carry out the object recognition method described in Embodiment 2.

In another implementation, the object recognition apparatus and the central processor 701 may be configured separately; for example, the object recognition apparatus may be configured as a chip connected to the central processor 701, and the functions of the object recognition apparatus are executed under control of the central processor 701.

Furthermore, as shown in FIG. 7, the image processing device 700 may include an input/out (I/O) device 703, and a display 704, etc.; wherein functions of the above components are similar to those in the related art, which shall not be described herein any further. It should be noted that the image processing device does not necessarily include all the parts shown in FIG. 7, and furthermore, the image processing device 700 may include parts not shown in FIG. 7, and the related art may be referred to.

An embodiment of this disclosure provides a computer readable program, which, when executed in an object recognition apparatus or an image processing device, will cause the object recognition apparatus or the image processing device to carry out the method described in Embodiment 2.

An embodiment of the present disclosure provides a computer readable medium, including a computer readable program, which will cause an object recognition apparatus or an image processing device to carry out the method described in Embodiment 2.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 6 may either correspond to software modules of procedures of a computer program, or correspond to hardware modules. Such software modules may respectively correspond to the steps shown in FIG. 5. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

The invention claimed is:

1. An apparatus to perform a single step object recognition neural network, comprising:
a processor to couple to a memory to implement,
multiple first convolutional layer groups, the multiple first convolutional layer groups being connected in series to extract features of an input image,
output of a last first convolutional layer group in the multiple first convolutional layer groups being taken as input of a detecting module to detect an object in the input image, and
each of the first convolutional layer groups comprising three first convolutional layers, the three first convolutional layers in the first convolutional layer group being connected to each other using a residual structure;
multiple second convolutional layers, each of the second convolutional layers being located between two first convolutional layer groups among the multiple first convolutional layer groups;
multiple second convolutional layer groups,
output of a second convolutional layer group among the multiple second convolutional layer groups being taken as input of the detecting module,
at least two second convolutional layer groups among the multiple second convolutional layer groups not being connected to each other, and the at least two second convolutional layer groups not being connected to each other, being connected to at least two first convolution layer groups among the first convolutional layer groups,
one of the at least two second convolutional layer groups not being connected to each other, being connected to another second convolutional layer group other than the at least two second convolutional layer groups not being connected to each other, and each of the second convolutional layer groups comprising at least two third convolutional layers, one of the at least two second convolutional layer groups not being connected to each other, being connected to another second convolutional layer group other than the at least two second convolutional layer groups not being connected to each other, in two connected second convolutional layer groups, and one of the at least two third convolutional layer groups using dilate convolution; and a fourth convolutional layer, the fourth convolutional layer being connected to a last second convolutional layer group in the multiple second convolutional layer groups, output of the fourth convolutional layer being taken as input of the detecting module.

2. The apparatus according to claim 1, wherein the second convolutional layers and the fourth convolutional layer are pooling layers.

3. The apparatus according to claim 1, wherein a stride of the dilate convolution is 2.

4. The apparatus according to claim 1, wherein the dilate convolution uses an Atrous algorithm or uses a Hole algorithm.

5. The apparatus according to claim 1, wherein the at least two first convolutional layer groups connected to the at least two second convolutional layer groups are not adjacent to each other.

6. The apparatus according to claim 5, wherein two first convolutional layer groups are connected to two second convolutional layer groups, and the two first convolutional layer groups connected to the two second convolutional layer groups are spaced apart by at least one first convolutional layer group.

7. The apparatus according to claim 1, wherein a dilated coefficient of a first convolutional layer in at least one first convolutional layer group in the multiple first convolutional layer groups is 2.

8. The apparatus according to claim 7, wherein a dilated coefficient of a first convolutional layer in a fourth first convolutional layer group from bottom in the multiple first convolutional layer groups is 2.

9. An apparatus, comprising:

a processor to couple to a memory and to, extract features of an input image by using a single step object recognition neural network; and perform object recognition according to the extracted features, the single step object recognition neural network comprises, multiple first convolutional layer groups, the multiple first convolutional layer groups being connected in series to extract features of the input image, output of a last first convolutional layer group in the multiple first convolutional layer groups being taken as input of a detecting module to detect an object in the input image, and each of the first convolutional layer groups comprising three first convolutional layers, the three first convolutional layers in the first convolutional layer group being connected to each other using a residual structure;

multiple second convolutional layers, each of the second convolutional layers being located between two first convolutional layer groups among the multiple first convolutional layer groups;

multiple second convolutional layer groups, output of a second convolutional layer group among the multiple second convolutional layer groups being taken as input of the detecting module, at least two second convolutional layer groups among the multiple second convolutional layer groups not being connected to each other, and the at least two second convolutional layer groups not being connected to each other, being connected to at least two first convolution layer groups among the first convolutional layer groups, one of the at least two second convolutional layer groups not being connected to each other, being connected to another second convolutional layer group other than the at least two second convolutional layer groups not being connected to each other, and each of the second convolutional layer groups comprising at least two third convolutional layers, one of the at least two second convolutional layer groups not being connected to each other, being connected to another second convolutional layer group other than the at least two second convolutional layer groups not being connected to each other, in two connected second convolutional layer groups, and one of the at least two third convolutional layer groups, using dilate convolution; and a fourth convolutional layer, the fourth convolutional layer being connected to a last second convolutional layer group in the multiple second convolutional layer groups, output of the fourth convolutional layer being taken as input of the detecting module.

10. The apparatus according to claim 9, wherein a size of the input image is greater than 300×300 pixels or less than 300×300 pixels.

11. An object recognition method for an apparatus, comprising:

extracting features of an input image by using a single step object recognition neural network; and performing object recognition according to the extracted features, the single step object recognition neural network comprises, multiple first convolutional layer groups, the multiple first convolutional layer groups being connected in series to extract features of the input image, output of a last first convolutional layer group in the multiple first convolutional layer groups being taken as input of a detecting module to detect an object in the input image, and each of the first convolutional layer groups comprising three first convolutional layers, the three first convolutional layers in the first convolutional layer group being connected to each other using a residual structure;

multiple second convolutional layers, each of the second convolutional layers being located between two first convolutional layer groups among the multiple first convolutional layer groups;

multiple second convolutional layer groups,
output of a second convolutional layer group among the multiple second convolutional layer groups being taken as input of the detecting module,
at least two second convolutional layer groups among the multiple second convolutional layer groups not being connected to each other, and the at least two second convolutional layer groups not being connected to each other, being connected to at least two first convolution layer groups among the first convolutional layer groups,
one of the at least two second convolutional layer groups not being connected to each other, being connected to another second convolutional layer group other than the at least two second convolutional layer groups not being connected to each other, and
each of the second convolutional layer groups comprising at least two third convolutional layers,
one of the at least two second convolutional layer groups not being connected to each other, being connected to another second convolutional layer group other than the at least two second convolutional layer groups not being connected to each other, in two connected second convolutional layer groups, and
one of the at least two third convolutional layers using dilate convolution; and
a fourth convolutional layer, the fourth convolutional layer being connected to a last second convolutional layer group in the multiple second convolutional layer groups,
output of the fourth convolutional layer being taken as input of the detecting module.

12. The method according to claim 11, wherein a size of the input image is greater than 300×300 pixels or less than 300×300 pixels.

* * * * *